(12) United States Patent
Cao et al.

(10) Patent No.: US 12,287,013 B1
(45) Date of Patent: Apr. 29, 2025

(54) INDUCTIVE POSITION SENSOR AND ELECTROMAGNETIC CLUTCH

(71) Applicant: Jing-Jin Electric Technologies Co., Ltd., Beijing (CN)

(72) Inventors: Yang Cao, Beijing (CN); Ping Yu, Beijing (CN); Jianwen Li, Beijing (CN); Pengyuan Zhou, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 18/776,698

(22) Filed: Jul. 18, 2024

(30) Foreign Application Priority Data

Oct. 12, 2023  (CN) .......................... 202311317017.5

(51) Int. Cl.
*F16D 27/14*  (2006.01)

(52) U.S. Cl.
CPC .......... *F16D 27/14* (2013.01); *F16D 2300/18* (2013.01)

(58) Field of Classification Search
CPC ..... F16D 27/14; F16D 2300/18; G01B 7/003; G01D 5/20; G01D 5/2006; G01D 5/2033
See application file for complete search history.

(56) References Cited

U.S. PATENT DOCUMENTS

| | | | | |
|---|---|---|---|---|
| 2,367,017 A * | 1/1945 | Gardiner | ............... | F16C 35/077 |
| | | | | 324/207.26 |
| 3,307,164 A * | 2/1967 | Zimmer | ................... | G01D 5/12 |
| | | | | 324/207.16 |
| 4,385,297 A * | 5/1983 | Schmitt | ..................... | G01B 7/14 |
| | | | | 340/870.18 |
| 6,034,624 A * | 3/2000 | Goto | ..................... | G01D 5/2216 |
| | | | | 324/207.16 |
| 8,109,089 B2 * | 2/2012 | Gilch | ....................... | F02C 9/20 |
| | | | | 60/602 |
| 9,995,778 B1 * | 6/2018 | Fiori, Jr. | ............ | G01R 27/2611 |
| 2003/0102862 A1 * | 6/2003 | Goto | ..................... | G01D 5/202 |
| | | | | 324/207.16 |
| 2007/0096722 A1 * | 5/2007 | Wilhelmy | ............. | G01D 5/2013 |
| | | | | 377/21 |
| 2016/0377126 A1 * | 12/2016 | Essenmacher | .......... | F16D 41/14 |
| | | | | 192/84.6 |
| 2019/0113367 A1 * | 4/2019 | Cis | .......................... | H01F 27/28 |

(Continued)

FOREIGN PATENT DOCUMENTS

JP            58219410 A    * 12/1983

OTHER PUBLICATIONS

JP58219410 translation (Year: 1983).*

*Primary Examiner* — Timothy Hannon
(74) *Attorney, Agent, or Firm* — Workman Nydegger

(57) ABSTRACT

An inductive position sensor, may include a movable part which is a magnetic conductor, and an induction coil assembly adjacent to the movable part. The induction coil assembly and the movable part form a magnetic circuit, the induction coil assembly has an input end for inputting a current and an output end for outputting a feedback current, and the inductive position sensor is used to detect a position of the movable part based on a relationship between the feedback current and the input current. The inductive position sensor has a flexible and compact structural design, and can be adjusted and arranged according to different applications and structural spaces, so it is applicable to a wide range of environments. An electromagnetic clutch is also disclosed.

12 Claims, 4 Drawing Sheets

(56) References Cited

U.S. PATENT DOCUMENTS

2020/0094676 A1* 3/2020 Creech ................... B60K 23/04
2020/0378453 A1* 12/2020 Barnes .................. F16D 27/108
2021/0301885 A1* 9/2021 Essenmacher .......... F16D 41/14

* cited by examiner

INDUCTIVE POSITION SENSOR AND ELECTROMAGNETIC CLUTCH

TECHNICAL FIELD

The present disclosure relates to the field of sensor technology, in particular to an inductive position sensor and an electromagnetic clutch.

BACKGROUND

New energy vehicles refer to vehicles that use unconventional fuel as a power source, integrate advanced technology in power control and driving, and have advanced technical principles and new structures.

New energy vehicles will face different working conditions during working process, including but not limited to smooth driving, acceleration and shifting, deceleration, parking, etc., which involve monitoring the movement of various mechanisms by a system, and a position sensor is a good choice to achieve this function. With the continuous development of compact and lightweight power systems for new energy vehicles, the requirements for the accuracy and diversity of position sensors are also increasing.

In the process of implementing the present disclosure, the inventor discovered at least the following problems in the prior art: the conventional position sensors have disadvantages such as large volume, high environmental requirements, the need for specific connectors, and the need to reserve layout space, which to some extent affects the spatial structure of the power system of new energy vehicles.

SUMMARY

The present disclosure aims to solve at least one of the technical problems in the related technology to a certain extent.

The purpose of the present disclosure is to propose a high-precision and compact inductive position sensor and an electromagnetic clutch.

To achieve the above purpose, a first aspect of the present disclosure proposes an inductive position sensor, comprising:

a movable part which is a magnetic conductor; and
an induction coil assembly adjacent to the movable part, wherein the induction coil assembly and the movable part form a magnetic circuit, the induction coil assembly has an input end for inputting a current and an output end for outputting a feedback current;
the inductive position sensor is used to detect a position of the movable part based on a relationship between the feedback current and the input current.

According to the inductive position sensor of the present disclosure, a magnetic circuit is formed by a movable part and an induction coil assembly. A current is input into the induction coil assembly. Based on the relationship between the feedback current and the input current, the position of the movable part can be accurately detected. The inductive position sensor of the present disclosure has flexible and compact structural design, and can be adjusted and arranged according to different applications and structural spaces, so it is applicable to a wide range of environments. The input and output ends of the induction coil assembly of the present disclosure can be integrated with other interfaces, thereby eliminating the need for specific connectors and fully optimizing the usage space. In addition, in the present disclosure, an independent magnetic circuit is formed by the movable part and the induction coil assembly, which has stronger anti-magnetic interference ability than other position sensors.

According to an embodiment of the present disclosure, the induction coil assembly comprises an electromagnetic coil assembly, an iron core, and a fixed part, wherein the fixed part is a magnetic conductor, the electromagnetic coil assembly is installed around the iron core, and the iron core is fixed to the fixed part at an end away from the movable part.

According to an embodiment of the present disclosure, the iron core is in an interference fit with the fixed part, or the iron core is connected to the fixed part through a fastener.

According to an embodiment of the present disclosure, the electromagnetic coil assembly comprises a coil framework and a coil, the coil is wound on the coil framework, and the coil framework and the coil are disposed between the movable part and the fixed part.

According to an embodiment of the present disclosure, when the iron core is in an interference fit with the fixed part, the fixed part is provided with a through hole that matches a shape of an end face of the iron core.

According to an embodiment of the present disclosure, the iron core is connected to the fixed part through a screw, and the fixed part is provided with a counterbore that matches a shape of an end face of the screw.

According to an embodiment of the present disclosure, the iron core is connected to the fixed part through a snap ring, and the fixed part is provided with a through hole that matches a shape of an end face of the iron core.

According to an embodiment of the present disclosure, the inductive position sensor further comprises a temperature sensor for detecting a temperature of the coil.

According to an embodiment of the present disclosure, the movable part is configured to reciprocate in an axial direction of the induction coil assembly.

A second aspect of the present disclosure proposes an electromagnetic clutch comprising the inductive position sensor as described in the first aspect.

The electromagnetic clutch of the present disclosure is a specific application of the inductive position sensor. The electromagnetic clutch has a movable part and a fixed part. A magnetic circuit is formed by the movable part and an induction coil assembly. A current is input into the induction coil assembly. Based on the relationship between the feedback current and the input current, the position of the movable part can be accurately detected. The electromagnetic clutch of the present disclosure has flexible and compact structural design, and can be adjusted and arranged according to different structural spaces, so it is applicable to a wide range of environments.

The additional aspects and advantages of the present disclosure will be partially provided in the following description, partially become apparent from the following description, or be understood through the practice of the present disclosure.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
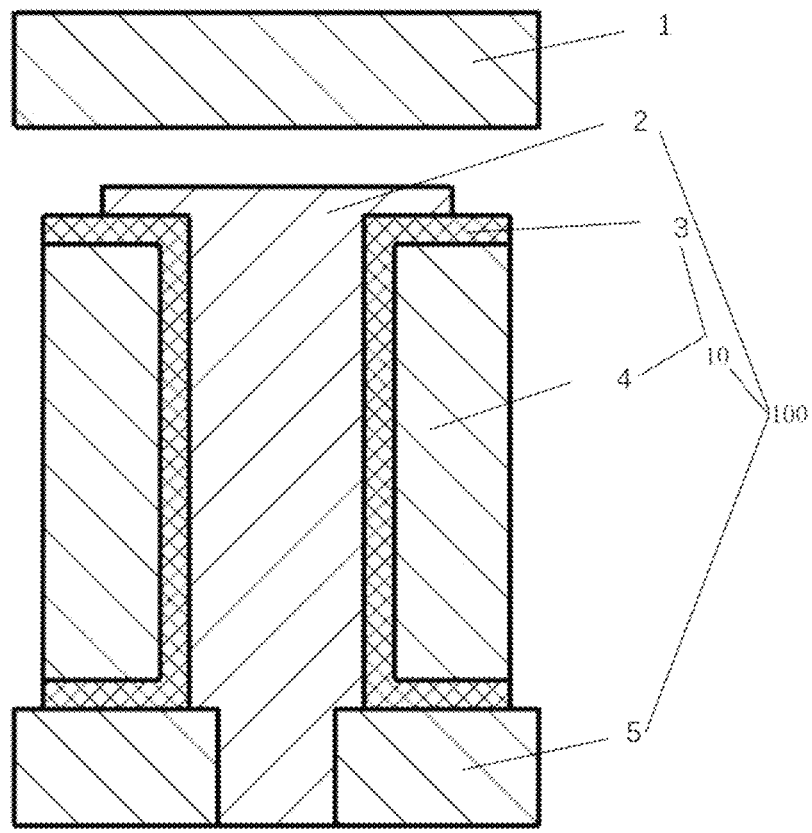
FIG. 1 is a schematic diagram of the structure of an inductive position sensor proposed in an embodiment of the present disclosure.

In the drawings: 1—movable part, 2—iron core, 3—coil framework, 4—coil, 5—fixed part, 6—clutch coil, 7—clutch coil framework, 10—electromagnetic coil assembly, 11—screw, 12—counterbore, 13—snap ring, 14—c, 15—temperature sensor, 100—induction coil assembly, 200—clutch coil assembly.

DETAILED DESCRIPTION

The embodiments of the p14-cresent disclosure will be described in detail below. The examples of the embodiments are shown in the accompanying drawings, and the same or similar reference numerals represent the same or similar components or components with the same or similar functions throughout the drawings. The embodiments described below with reference to the accompanying drawings are exemplary and are only intended to explain the present disclosure and cannot be understood as limitations to the present disclosure. On the contrary, the embodiments of the present disclosure include all changes, modifications, and equivalents that fall within the spirit and connotation of the appended claims.

FIG. 1 is a schematic diagram of the structure of an inductive position sensor proposed in an embodiment of the present disclosure. Referring to FIG. 1, the embodiment of the present disclosure provides an inductive position sensor, which comprises a movable part 1 and an induction coil assembly 100.

The movable part 1 is a magnetic conductor. The movable part is a magnetic conductive component, which can be installed on a movable part of the mechanism to be tested. Alternatively, the moving and magnetic conductive part in the mechanism to be tested may be directly used as the movable part.

The induction coil assembly 100 is adjacent to the movable part 1. The induction coil assembly 100 and the movable part 1 form a magnetic circuit. The induction coil assembly 100 has an input end for inputting a current and an output end for outputting a feedback current. The induction coil assembly 100 can utilize the self inductance change of the coil to achieve measurement. When an air gap between the movable part and the induction coil assembly 100 changes, a distance between the movable part and the induction coil assembly 100 is measured based on different induction states of the induction coil assembly 100. The input and output ends of the induction coil assembly 100 may both be integrated with other interfaces.

In actual work of the induction coil assembly 100, the movable part 1 can move with the mechanism to be tested on one side of the induction coil assembly 100. The gap between the movable part 1 and the induction coil assembly 100 is constantly changing during the movement of the movable part 1, and the induction coefficient of the magnetic circuit formed by the induction coil assembly 100 and the movable part 1 changes accordingly. Therefore, when a certain current pulse is input to the induction coil assembly 100, different current signals will be output, so the position of the movable part 1 can be measured. The movable part 1 can move freely with respect to the induction coil assembly 100. In order to accurately measure the relative distance between them, the movable part 1 is configured to reciprocate in an axial direction of the induction coil assembly 100.

The input current may be a pulse current or an alternating current. The pulse current has a constant direction but its intensity constantly changes, and its waveform can be various, such as sine wave, square wave, etc. The inductive position sensor needs to be calibrated in advance to find the relationship between the input and the output. In other words, the relationship between the feedback current and the pulse current under different distances between the movable part 1 and the induction coil assembly 100 needs to be determined. When the inductive position sensor is used, the position of the movable part 1 is detected based on the determined relationship between the feedback current and the pulse current.

Figure 4:
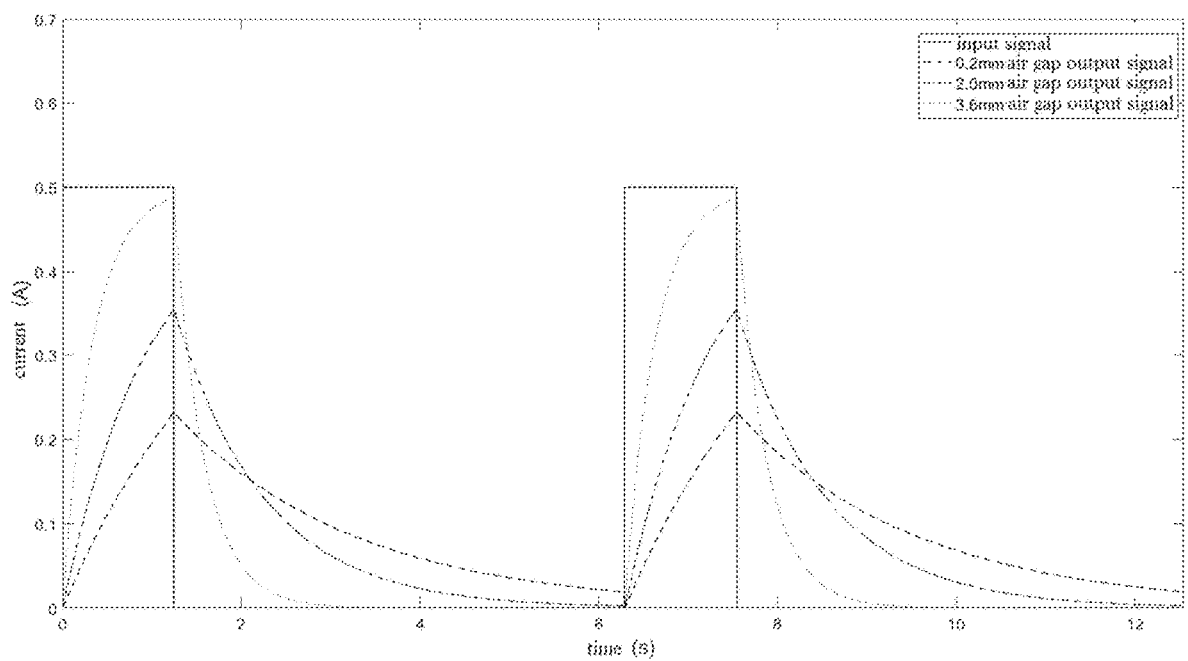
FIG. 4 is a working curve of the inductive position sensor proposed in an embodiment of the present disclosure.
Figure 5:
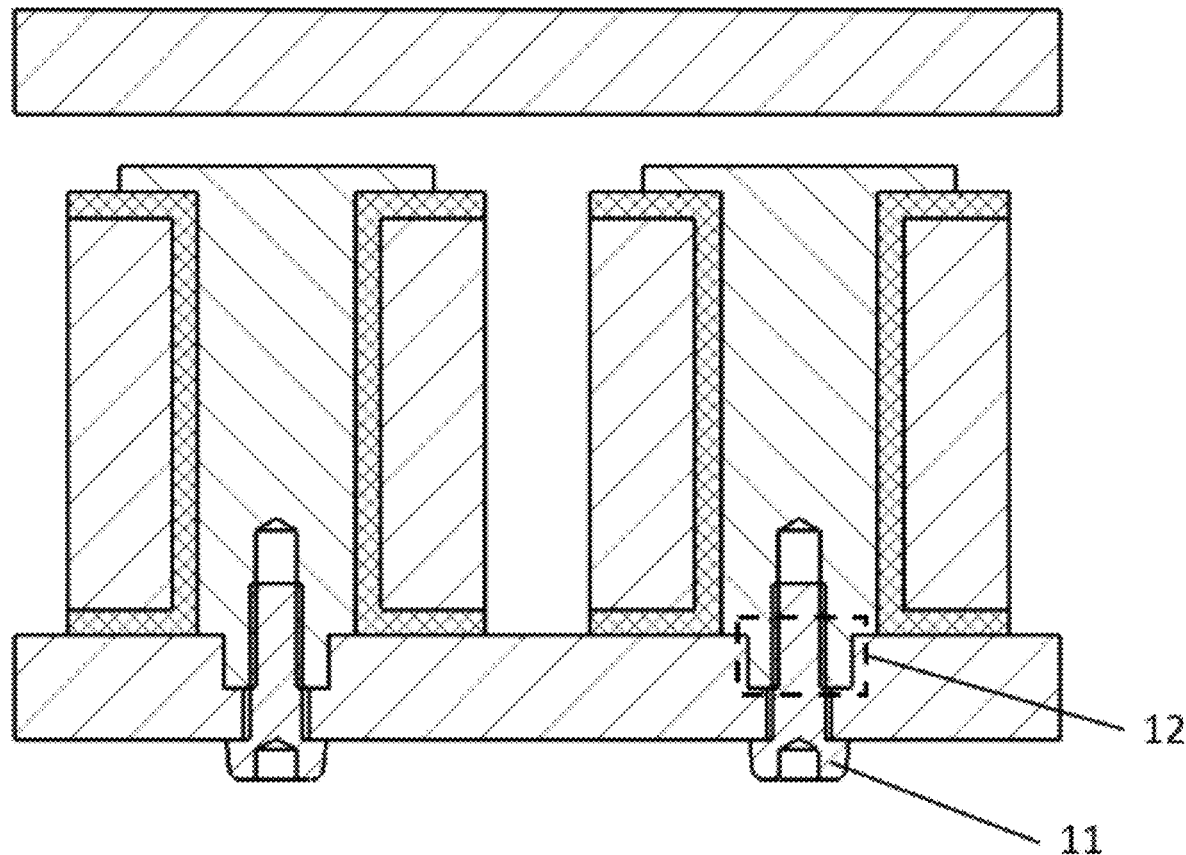
FIG. 5 is a schematic diagram showing the screw and counterbore in an embodiment of the present disclosure.
Figure 6:
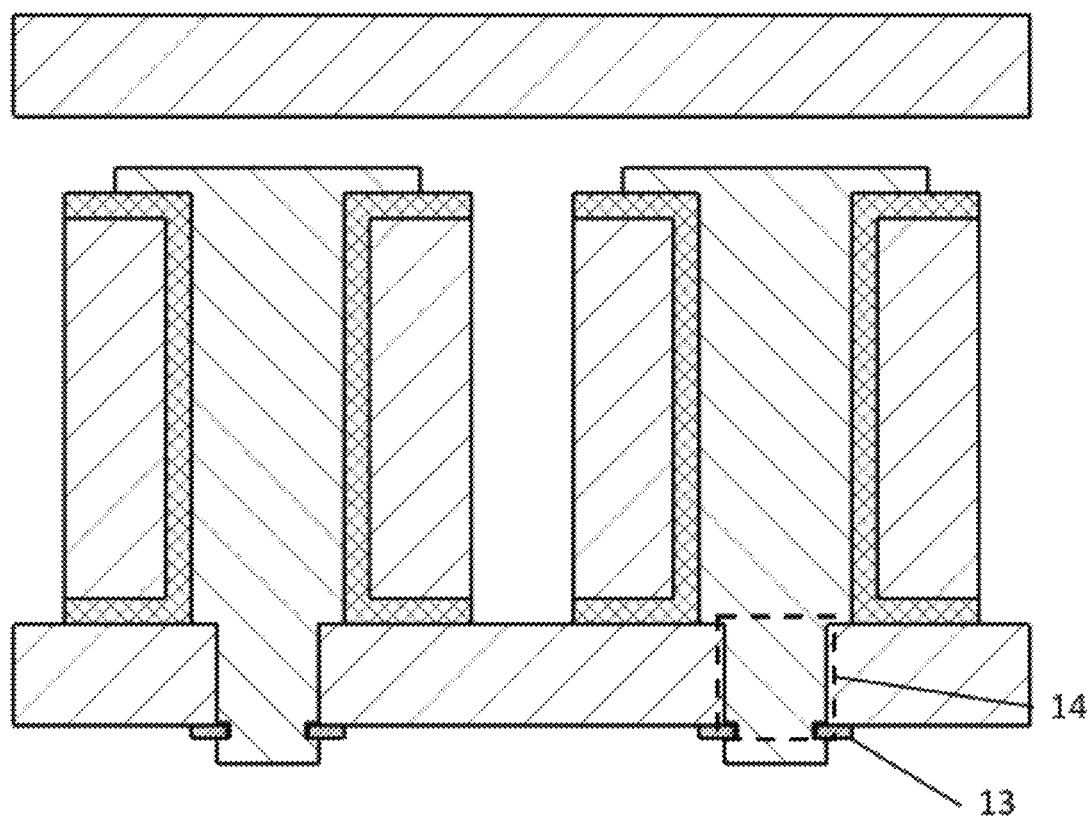
FIG. 6 is a schematic diagram showing the snap ring and through hole in another embodiment of the present disclosure.
Figure 7:
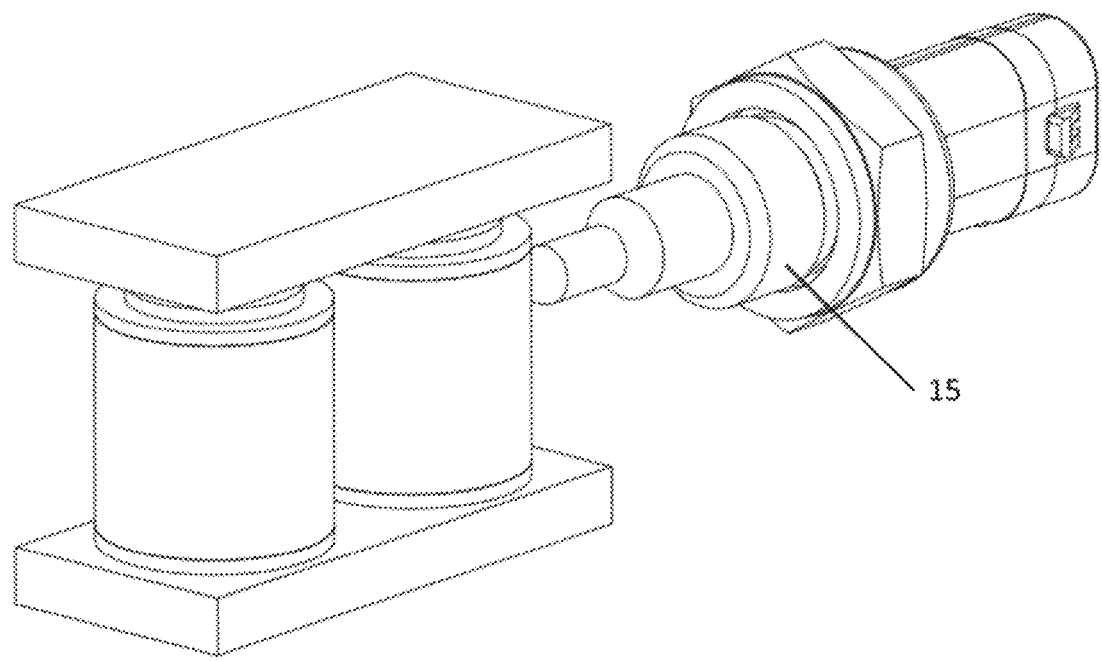
FIG. 7 is a schematic diagram showing the temperature sensor in an embodiment of the present disclosure.

In an embodiment, as shown in FIG. 4, when the distance between the movable part 1 and the induction coil assembly 100 is the greatest, the induction coefficient of the induction coil assembly 100 is the smallest. At this point a rectangular pulse current with a certain duty cycle is applied to the induction coil assembly 100, a corresponding current signal will be obtained from the output end. The range of pulse current may be 10 to 50 mA. When the distance between the movable part 1 and the induction coil assembly 100 is the smallest, the induction coefficient of the induction coil assembly 100 is the greatest. At this point the same pulse current with a certain duty cycle is applied to the induction coil assembly 100, another corresponding current signal will be obtained from the output current signal. At this point the peak value of the output current signal will be smaller than the peak value of the output current signal at the greatest distance. By calibrating the output electrical signals at different distances between the movable part 1 and the induction coil assembly 100, the position of the movable part can be monitored in real-time.

According to the inductive position sensor of the embodiment of the present disclosure, a magnetic circuit is formed by a movable part and an induction coil assembly, a current is input into the induction coil assembly, and based on the relationship between the feedback current and the input current, the position of the movable part can be accurately detected. The inductive position sensor of the present disclosure has flexible and compact structural design, and can be adjusted and arranged according to different applications and structural spaces, so it is applicable to a wide range of environments. The input and output ends of the induction coil assembly of the present disclosure can be integrated with other interfaces, thereby eliminating the need for specific connectors and fully optimizing the usage space. In addition, in the present disclosure, an independent magnetic circuit is formed by the movable part and the induction coil assembly, which has stronger anti-magnetic interference ability than other position sensors.

In some embodiments, the induction coil assembly 100 comprises an electromagnetic coil assembly 10, an iron core 2, and a fixed part 5. The fixed part 5 is a magnetic conductor, the electromagnetic coil assembly 10 is installed around the iron core 2, and the iron core 2 is fixed to the fixed part 5 at an end away from the movable part 1. The fixed part 5 may be a separate part, alternatively, a fixed part on the mechanism to be tested can be directly used as the fixed part 5, as long as the fixed part 5 has magnetic conductivity. From FIG. 1, it can be seen that the distance between the movable part 1 and the induction coil assembly 100 is the distance between an end face of the iron core 2 and the movable part 1.

The electromagnetic coil assembly 10 comprises a coil framework 3 and a coil 4, and the coil 4 is wound on the coil framework 3. The coil framework 3 is used to secure coil 4. The coil framework 3 and coil 4 are arranged between the movable part 1 and the fixed part 5. The coil framework 3 is installed around the iron core 2.

The iron core 2 and the fixed part 5 may be connected in the following ways. First, the iron core 2 and the fixed part 5 are in interference fit. Second, the iron core 2 and the fixed part 5 are connected through a fastener.

When the iron core 2 is in an interference fit with the fixed part 5, the fixed part 5 is provided with a through hole that matches the shape of the end face of the iron core 2. The iron core 2 is firmly inserted into the fixed part 5 at the end away from the movable part 1.

When the iron core 2 is connected to the fixed part 5 through a fastener, the iron core 2 may be connected to the fixed part 5 through a screw 11. The fixed part 5 is provided with a counterbore 12 that matches the shape of the end face of the screw 11, and the screw 11 can be fully embedded into the surface of the fixed part 5, thereby improving the firmness between the iron core 2 and the fixed part 5. The iron core 2 and the fixed part 5 may also be connected through a snap ring 13, and the fixed part 5 is provided with a through hole 14 that matches the shape of the end face of the iron core 2. The advantage of a snap ring connection is its quick disassembly and assembly.

In some embodiments, the inductive position sensor further comprises a temperature sensor 15 for detecting the temperature of the coil 4. The coil 4 will generate heat when it works, which causes a change in the resistance of the coil 4, and in turn affects the output current of the coil 4. By feeding back the coil resistance through the temperature of the coil 4, and measuring the output current of the coil 4 at different temperatures, the inductive position sensor can be accurately calibrated, thereby improving its measurement accuracy.

Figure 2:
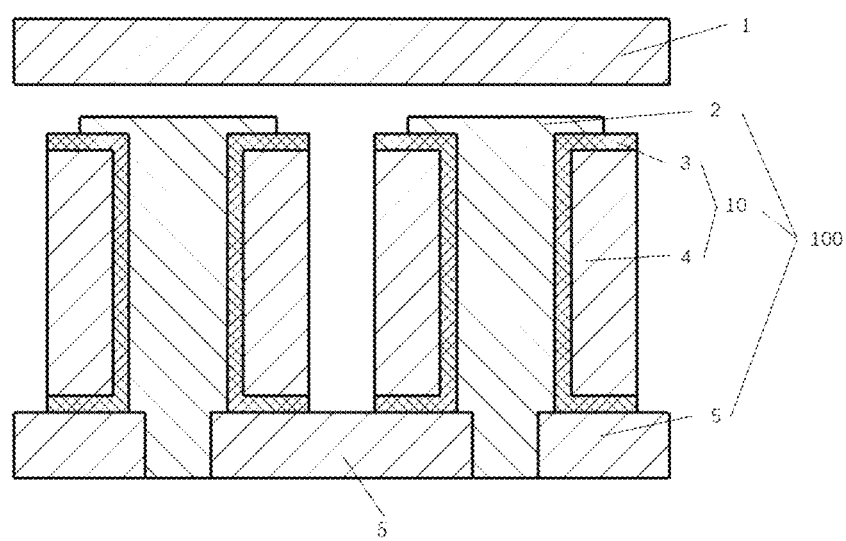
FIG. 2 is a schematic diagram of the structure of an inductive position sensor proposed in another embodiment of the present disclosure.

FIG. 2 is a schematic diagram of the structure of an inductive position sensor proposed in another embodiment of the present disclosure. In the embodiment shown in FIG. 2, there are two induction coil assemblies 100, which may be distributed at different positions of the mechanism to be tested, and arranged according to the actual space of the mechanism to be tested. The distance between the movable part and the induction coil assembly can be more accurately measured through two distance measurement values.

There may be more induction coil assemblies 100, which can be arranged according to the actual available space of the mechanism to be tested and the required measurement accuracy.

Figure 3:
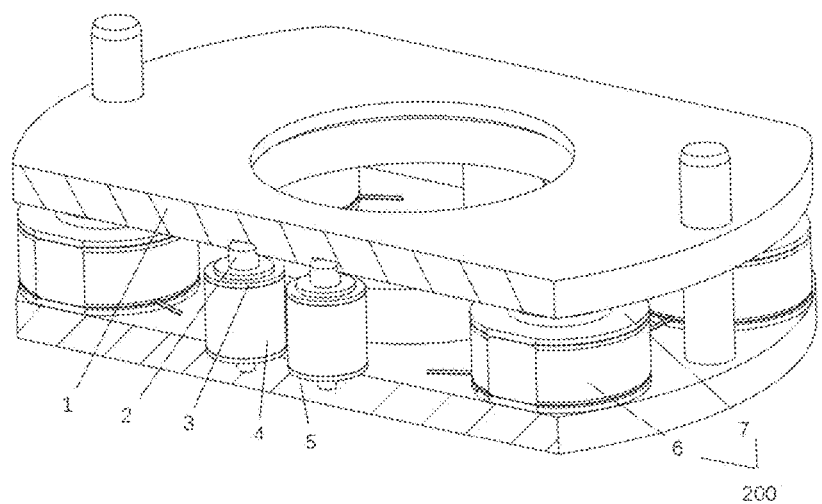
FIG. 3 is a schematic diagram of the structure of an electromagnetic clutch proposed in an embodiment of the present disclosure.

FIG. 3 is a schematic diagram of the structure of an electromagnetic clutch proposed in an embodiment of the present disclosure. The electromagnetic clutch of the embodiment of the present disclosure comprises the above inductive position sensor. In this embodiment, the inductive position sensor is specifically applied to a monostable electromagnetic clutch, in which a fixed magnetic yoke with magnetic conductivity is directly used as the fixed part 5, a movable armature plate with magnetic conductivity is directly used as the movable part 1, and several electromagnetic coil assemblies and iron cores are installed between the fixed part 5 and the movable part 1. The electromagnetic clutch has several clutch coil assemblies 200 inside. Each clutch coil assembly 200 comprises a clutch coil 6 and a clutch coil framework 7, and a clutch iron core runs through the center of the clutch coil assembly 200. The axes of the iron core and the clutch iron core are parallel to each other.

The movable armature plate can reciprocate in an axial direction of the clutch core under the action of the clutch coil component 200 and an elastic assembly. When the electromagnetic clutch works, the induction coil assembly is fed with a fixed amount of current with a certain duty cycle. When the air gap between the movable armature plate and the end face of the clutch core changes, the precise position parameters of the movable armature plate can be obtained by measuring the pulse signal change rate of the output signal of the coil.

The electromagnetic clutch in this embodiment can be applied to situations where there are certain limitations in the circumferential direction space and the axial space is small.

As can be seen from the above, the electromagnetic clutch in the embodiment of the present disclosure is a specific application of the inductive position sensor. The electromagnetic clutch has a movable part and a fixed part. A magnetic circuit is formed by the movable part and an induction coil assembly. A current is input into the induction coil assembly. Based on the relationship between the feedback current and the input current, the position of the movable part can be accurately detected. The electromagnetic clutch of the present disclosure has flexible and compact structural design, and can be adjusted and arranged according to different structural spaces, so it is applicable to a wide range of environments.

It should be noted that in the description of the present disclosure, the terms "first", "second", etc. are merely for convenience of describing the present disclosure and cannot be understood as indicating or implying relative importance. In addition, in the description of the present disclosure, unless otherwise specified, the meaning of "multiple" refers to two or more.

In the description of the present disclosure, it should be noted that unless otherwise expressly specified and defined, the terms "installed", "connected", "fixed" and the like should be understood in a broad sense, for example, it may be fixedly connected, or removably connected, or integrally connected; it may also be mechanically connected or electrically connected or communicated each other; it may also be directly connected or indirectly connected through a middleware; it may also be internally communicated or interacted between two components. For a person of ordinary skill in the art, the specific meaning of these terms in the present disclosure should be understood according to specific situations.

In the present disclosure, unless otherwise specified and limited, when the first feature is "on" or "under" the second feature, they may be in direct contact, or in indirect contact through intermediate media. Moreover, when the first feature is "above" the second feature, it may be that the first feature is directly or diagonally above the second feature, or simply indicates that the horizontal height of the first feature is greater than that of the second feature. When the first feature is "below" the second feature, it may be that the first feature is directly or diagonally below the second feature, or simply indicates that the horizontal height of the first feature is less than that of the second feature.

In the description of the present disclosure, the terms "left", "right", "front", "back", etc. are orientation or positional relationship based on the drawings, which are merely for convenience of describing the present disclosure and simplifying the description, rather than indicating or implying that the device or element referred to must have a specific orientation, or must be constructed and operated with a specific orientation, they should not be construed as limiting the present disclosure.

Any description of process or method in the flowchart or otherwise described herein can be understood as representing a module, fragment, or part of code that includes one or more executable instructions for implementing specific logical functions or steps of the process, and the scope of the preferred embodiments of the present disclosure also includes other implementations, which may not be in the order shown or discussed, and may include performing functions in a substantially simultaneous manner or in reverse order based on the functions involved, which should be understood by those skilled in the art to which the embodiments of the present disclosure belong.

In the description of this specification, the reference to terms such as "an embodiment", "some embodiments", "examples", "specific examples", or "some examples" means that the specific features, structures, materials, or features described in conjunction with the embodiment or example are included in at least an embodiment or example of the present disclosure. In this specification, the schematic expressions of the above terms do not necessarily refer to the same embodiments or examples. Moreover, the specific features, structures, materials, or features described can be combined in an appropriate manner in any one or more embodiments or examples.

Although embodiments of the present disclosure have been shown and described above, it can be understood that the above embodiments are exemplary and cannot be understood as limitations to the present disclosure. An ordinary skilled in the art can make changes, modifications, substitutions, and variations to the above embodiments within the scope of the present disclosure.

What is claimed is:

1. An inductive position sensor, comprising:
a movable part which is a magnetic conductor; and
an induction coil assembly adjacent to the movable part, wherein the induction coil assembly and the movable part form a magnetic circuit, the induction coil assembly has an input end for inputting a current and an output end for outputting a feedback current;
the inductive position sensor is used to detect a position of the movable part based on a relationship between the feedback current and the input current,
wherein the induction coil assembly comprises an electromagnetic coil assembly, an iron core, and a fixed part, wherein the fixed part is a magnetic conductor, the electromagnetic coil assembly is installed around the iron core, and the iron core is fixed to the fixed part at an end away from the movable part,
wherein the iron core is in an interference fit with the fixed part, or the iron core is connected to the fixed part through a fastener,
wherein when the iron core is in the interference fit with the fixed part, the fixed part is provided with a through hole that matches a shape of an end face of the iron core.

2. The inductive position sensor according to claim 1, wherein the electromagnetic coil assembly comprises a coil framework and a coil, the coil is wound on the coil framework, and the coil framework and the coil are disposed between the movable part and the fixed part.

3. The inductive position sensor according to claim 2, further comprising a temperature sensor for detecting a temperature of the coil.

4. An electromagnetic clutch comprising the inductive position sensor as claimed in claim 3.

5. An electromagnetic clutch comprising the inductive position sensor as claimed in claim 2.

6. The inductive position sensor according to claim 1, wherein the fastener comprises a screw, wherein the iron core is connected to the fixed part through the screw, and the fixed part is provided with a counterbore that matches a shape of an end face of the screw.

7. An electromagnetic clutch comprising the inductive position sensor as claimed in claim 6.

8. The inductive position sensor according to claim 1, wherein the fastener comprises a snap ring, wherein the iron core is connected to the fixed part through the snap ring, and the fixed part is provided with a through hole that matches a shape of an end face of the iron core.

9. An electromagnetic clutch comprising the inductive position sensor as claimed in claim 8.

10. The inductive position sensor according to claim 1, wherein the movable part is configured to reciprocate in an axial direction of the induction coil assembly.

11. An electromagnetic clutch comprising the inductive position sensor as claimed in claim 10.

12. An electromagnetic clutch comprising the inductive position sensor as claimed in claim 1.

* * * * *